UNITED STATES PATENT OFFICE.

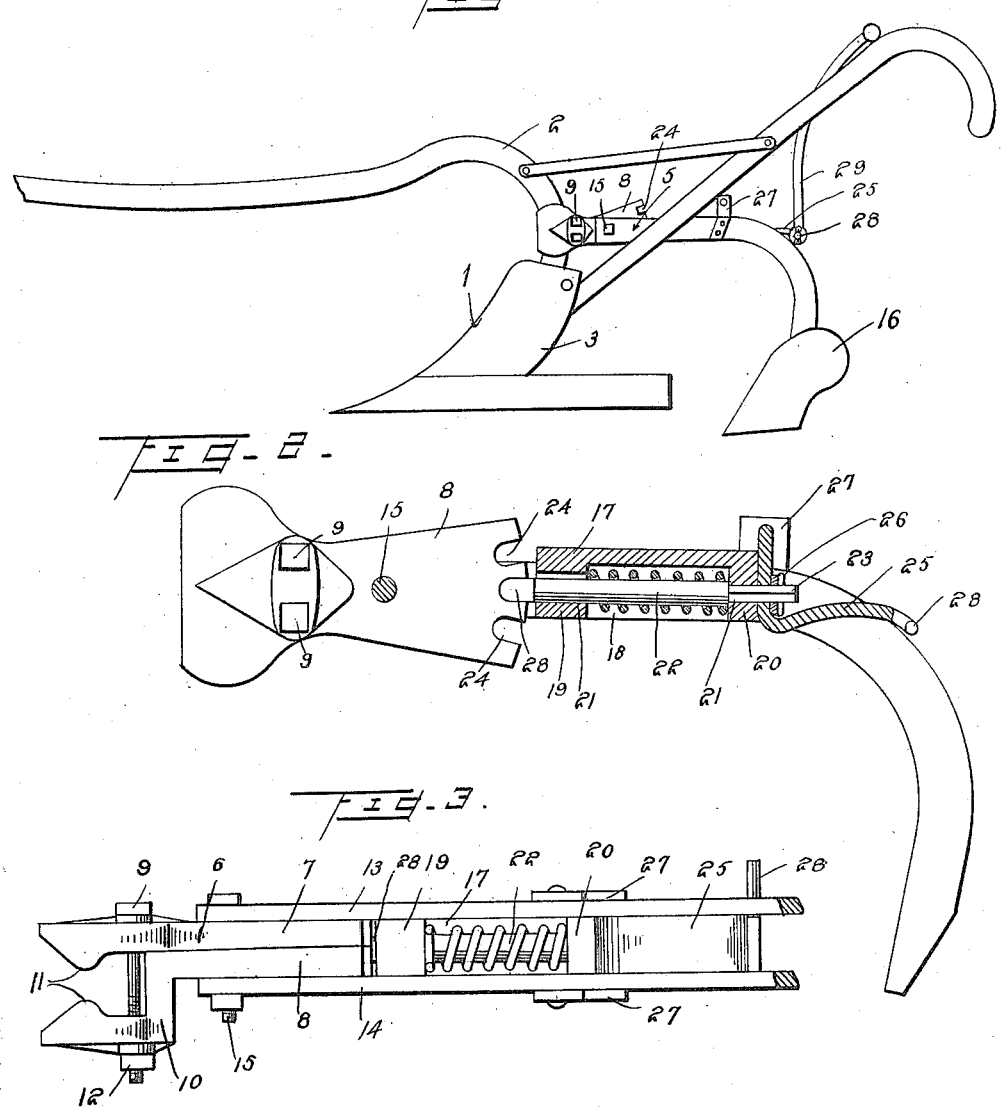

JACOB SAMUEL COONS, OF TAYLORSVILLE, NORTH CAROLINA.

SUBSOILING ATTACHMENT FOR BREAKING-PLOWS.

1,236,270.

Specification of Letters Patent.

Patented Aug. 7, 1917.

Application filed April 14, 1916. Serial No. 91,090.

*To all whom it may concern:*

Be it known that I, JACOB S. COONS, a citizen of the United States, residing at Taylorsville, in the county of Alexander and State of North Carolina, have invented certain new and useful Improvements in Subsoiling Attachments for Breaking-Plows; and I do hereby declare the following to be a full, clear, and exact description of the invention, such as will enable others skilled in the art to which it appertains to make and use the same.

This invention relates to a subsoiling attachment for breaking plows, and the primary object of the invention is to provide a subsoiling blade or plow supporting standard which may be connected to the beam of an ordinary breaking plow.

A further object of the invention is to provide an attachment as specified which includes a member adapted for rigid detachable connection to the beam of a breaking plow directly above the mold board of the plow, which has a shovel or subsoiling plow carrying standard pivotally connected thereto, and to provide a spring controlled pin for holding the standards in various adjusted positions with respect to the rigid attaching portion of the attachment.

With the foregoing and other objects in view this invention consists in the novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of a breaking plow showing the sub-soiling attachment connected thereto, Fig. 2 is a sectional view through the subsoiling attachment, and Fig. 3 is a bottom plan view of the subsoiling attachment having the rear end of the standard broken away.

Referring more particularly to the drawings, 1 designates a breaking plow structure of ordinary construction, which includes a beam 2, and the plow proper 3.

The sub-soiling attachment generically indicated by the numeral 5 is attached to the beam 2 a short distance above the plow structure 3, as clearly shown in Fig. 1 of the drawings by means of the attaching section 6 of the attachment. The section 6 of the attachment comprises a pair of members 7 and 8 which have their inner edges lying in facial abutment with each other. A bolt 9 is provided for connecting the section. The section 8 is provided with an angled portion 10 as is clearly shown in Fig. 3 of the drawings, and the outer end of the section 7 and the outer end of the angled portion 10 of the section 8 have ribs 11 formed on their inner surfaces which are provided for gripping the beam 2. The section 6 is held securely connected to the beam 2 by the adjustment of the nut 12 upon the bolt 9.

A pair of bars 13 and 14 are pivotally connected by means of a bolt 15 to the sections 7 and 8 and extend rearwardly therefrom, having their lower ends curving downwardly and shaped for supporting connection with the subsoiling plow 16. A block 17 is rigidly mounted between the spaced bars 12 and 13, and it is provided with a cutout portion 18, and end lugs 19 and 20. The lugs 19 and 20 are provided with bores 21 extending therethrough. A pin 22 is seated in the recess 18 and extends through the bore 21 of the lug 19. The pin 22 has its rear end reduced as shown at 23, which reduced portion extends through and projects outwardly from the bore 21 of the lug 20. The forwardly extending end of the pin 18 is flattened, and provided for seating in notches 24 which are formed in the rear edges of the sections 7 and 8, for holding the bars 13 and 14 of various pivotal positions with respect to the attaching portion 6.

A plate 25 is connected to the reduced end 23 of the pin 22 by a cotter pin or analogous structure 26. The plate 25 is pivotally supported by upstanding ears 27 which are attached to each of the side bars 13 and 14. The plate 25 has a transversely extending pin 28 formed upon its rear lower end, to which pin a lever 29 is connected. By moving the lever 29 the plate 25 may be rocked upon its pivotal support by moving the flattened end 28 of the pin 22 out of any one of the notches 24 for permitting of pivotal movement of the bars 13 and 14 with respect to the attaching section 6 of the attachment.

In reducing the invention to practice such minor features of construction, combination and arrangement of parts may necessitate alterations to which the patentee is entitled provided such alterations are comprehended within the scope of what is claimed.

What is claimed is:

In a subsoiling attachment for plows, an attaching section composed of a pair of plates having the greater portion of their facing surfaces abutting, the rear edges of said plates being arcuate and provided with a plurality of spaced notches, one of said plates having a right angularly extending portion formed thereon near its forward end, whereby the forward end of said plate is spaced from the facing side of the other plate, inwardly extending beam gripping lugs formed upon said facing portions and shaped to firmly grip a plow beam, a bolt extending through the face portions of said plates for clamping them upon a plow beam, a pair of bars pivotally connected to said plates at the axis of the curved rear ends of the plates, means carried by said bars for detachable engagement with said notches for holding said bars in various pivoted positions with respect to the attaching section, said pivoted bars forming a supporting beam for a subsoiler.

In testimony whereof I affix my signature in presence of two witnesses.

JACOB SAMUEL COONS.

Witnesses:
DONALD T. APPLEGATE,
C. C. COONSE.

Copies of this patent may be obtained for five cents each, by addressing the "Commissioner of Patents, Washington, D. C."